United States Patent [19]

Straten

[11] Patent Number: 5,372,726
[45] Date of Patent: Dec. 13, 1994

[54] COMPOUND FOR THE TREATMENT OF WATER POLLUTED WITH METAL IONS, PROCESS FOR ITS PRODUCTION AND APPLICATION

[76] Inventor: Günter Straten, Nordhoffstrasse 14, D-5100 Aachen, Germany

[21] Appl. No.: 938,236

[22] Filed: Nov. 3, 1993

[30] Foreign Application Priority Data

Apr. 30, 1990 [DE] Germany .................. 4013974

[51] Int. Cl.$^5$ .............................. C02F 1/62
[52] U.S. Cl. ..................... 210/728; 210/912; 252/175; 252/180; 423/351; 423/512.1; 564/17; 568/20
[58] Field of Search ............ 210/723, 724, 912, 914, 210/728, 719; 423/92, 101, 140, 511, 512.1, 351; 252/175, 180, 181; 568/20; 564/17

[56] References Cited

U.S. PATENT DOCUMENTS

| | | | |
|---|---|---|---|
| 4,387,034 | 6/1983 | Unger et al. | 210/728 |
| 4,612,125 | 9/1986 | Elfline | 210/912 |
| 4,957,634 | 9/1990 | Bowers, Jr. | 210/912 |
| 4,971,775 | 11/1990 | Hoy et al. | 210/729 |
| 4,980,071 | 12/1990 | Schuster et al. | 210/912 |
| 5,205,939 | 4/1993 | Syrinek | 210/912 |
| 5,264,135 | 11/1993 | Mohn | 210/912 |

*Primary Examiner*—Neil McCarthy
*Attorney, Agent, or Firm*—Michael M. de Angeli

[57] ABSTRACT

A compound for the treatment of water polluted by metal ions is obtained by the reaction of potassium or sodium hydroxide in aqueous solution with thiocarbamide and potassium or sodium hyposulfate. After a period of settling, a precipitate forms and is removed; the clear liquid above the precipitate is decanted and used for treating water polluted with metal ions.

12 Claims, No Drawings

COMPOUND FOR THE TREATMENT OF WATER POLLUTED WITH METAL IONS, PROCESS FOR ITS PRODUCTION AND APPLICATION

BACKGROUND OF THE INVENTION

The invention concerns a compound for the treatment of water containing metal ions and possibly other organic and/or inorganic pollutants, as well as a procedure for its production and its application in the separation of heavy and nonferrous heavy metals and dissolved, suspended or emulsified organic and/or inorganic components from aqueous systems.

Heavy and nonferrous heavy metals are widely used as components of alloys in steels and refined or corrosion resistant coatings in connection with synthetic or natural materials in all industrial countries. The technologies of modern industrial production produce, with the use of metals from the selection of the supplemental group of elements and some heavy metals of the third to fifth main group of the periodic system, apart from useful application, by their nature also a waste problem.

It is already known from R. Bauer, J. Wehling: "Thiocarbamide as precipitant for heavy metal sulfides" in Fresenius' Zeitschrift für Analytische Chemie, 199th volume Springer-Verlag Berlin, 1964, pages 171 to 175, to treat metal ions with water, thiocarbamides and soda lye.

From DE-24 37 779-A1 a product and procedure for the removal of mercury and/or mercury salts from waste waters containing thiocarbamide and/or hydroxylamine salts, is also known.

In addition, a procedure for the processing of solutions containing copper and complexing agents, in which thiocarbamide is also used, is known from DE-26 08 153-A1.

Also known, from DE-22 42 473-A1, is a treatment procedure for a spent, currentless processing or stripping solution, in which sodiumhyposulfite is added.

Also known, from DE-21 22 415-A1, is a process for the detoxification, clarification and recovery of metal salts from waste waters and residual concentrates by reduction of the metals by means of hydrosulfite concentrate (sodiumhyposulfite) or hydrazine with the simultaneous application of an inoculating material [detoxifier] and sedimentation accelerator [enhancer] for the shortening of the precipitation time and reduction of the sludge volume, in which sodiumhyposulfite is used.

Also known, from DE-38 22 922-A1, is a procedure for the separation of heavy metals from waste waters, as well as preciptators for the execution of this procedure and procedures for the production of the precipitator, in which thiosulfates are used.

Also known, from Chemical Abstracts, Vol. 93, 1980, page 306, nr 93: 119741c is already the precipitation of ferrous cyanite from waste water, in which sodiumthiosulfates and sodiumhyposulfite are used among others.

From Pol. PL 125 519 in Chemical Abstracts, Vol. 101, 1984, page 276, nr 101: 59686k a procedure is already known for the detoxification of industrial waste waters, in which $Na_2S_2O_4$ is used.

From JP 60-106585 (A) in Patents Abstracts of Japan, Seht G, 1985, Vol 9, nr 254 [C-308] a procedure is already known for the removal of heavy metals in which dithiocarbaminic acid is used among others.

From JP 75-72 451 in Chemical Abstracts, Vol. 83, 1975, page 279, nr 83: 197 620 v, a treatment of waste waters is already known which contains, among other things, citric acid.

From JP 75-72 867 in Chemical Abstracts, Vol. 84, 1976, page 281, nr 84: 35 077 s, a treatment of waste waters, containing, among other things, thiocarbamide is already known.

Also known, from DE-23 06 249-A1 is a procedure for the separation of toxic metal ions from waste water, in which a xanthate is used.

In addition, a procedure is known from DE-22 55 175-A1 for the reduction of dithiocarbamate content in waste waters.

Also known, from DE-23 12 233-B2, is a procedure for the removal of heavy metals from solutions, in which a polymer is used.

From DE-23 32 705-A1 a heavy metal binding agent, a procedure for its production and its application is known, whereby it contains a certain resin.

Finally, from U.S. Pat. No. 4,354,942, a procedure is known for the stabilization of mercury in mercury containing materials, which uses an inorganic sulfur compound of a certain kind.

After a careful estimate, some 5% of the produced or used metallic elements in production or processing procedures remain as remainders [residuals] or waste materials in pure form or in compounds, which, with the currently known methods, can in part not be recycled economically. Apart from economic aspects, which would make a low-cost technical recovery and thus reduction of the cost and currency needs for the acquisition of raw materials, as well as a stretching of the raw material resources desirable, the ecological aspects of volume reduction of special refuse, particularly the heavy and non-ferrous heavy metals that have toxic effects on almost all biological species, are important.

The removal of toxic heavy and non-ferrous heavy metal from the waste water of the metal processing industry is still done to a large extent by the classical method of hydroxide precipitation with soda lye, milk of lime or, in special cases, with sodium carbonate. Based on the wide pH-range into which the hydroxides and oxyhydrates fall, and based on mixed reactions, e.g. of various bivalent metals with similar ion radii, it is necessary, however, to determine for each metal ion mixture the optimal "compromise" pH-value empirically by advanced testing, as a great number of factors influence and overshadow the process of precipitation. The hydroxide precipitation of heavy and non-ferrous heavy metals has, in principle, four other substantial disadvantages:

1. The solubility products of the metal hydroxides are by at least 7 to 10 powers of ten greater than those of the corresponding sulfides. The solubility of the metal hydroxides also is an estimate, depending on the matrix proportion of the solutions, up to the value of ten million times higher than that of the corresponding sulfides.

2. The neutral salt influence in the precipitation medium, which leads to the increase of the solubility, has a considerably stronger effect with hydroxide precipitation than with sulfide precipitation. In addition, a negative influence on the sedimentation behavior and filterability of the precipitate can often be observed.

3. Hydroxide precipitation of some heavy and non-ferrous heavy metals in the presence of complexing agents is not at all possible or only to an unsatisfactory extent.

4. The metal hydroxides precipitated according to this classical method can only be recycled by using difficult and costly methods. For this reason, hydroxide sludges from the metal processing industry are up to now usually disposed of as special [i.e., hazardous] waste at high costs.

Contrary to this, the solubility products of most metal sulfides are so low that the quantitative precipitation of the metal ions themselves occurs from solutions that are strongly complexing agent containing. In spite of this, sulfide precipitation is rarely performed in the area of waste water. On the one hand, the use of the unpleasantly smelling, toxic and flammable hydrogen sulfide is not without its problems and, on the other hand, most of the metal sulfides have an unsatisfactory precipitation from the aqueous phase.

In the practice of waste water purification, various organic sulfides have been introduced for special applications within recent years. The organic sulfides work according to the same principle as the sulfides and precipitate, among others, copper, cadmium, mercury, lead, nickel, tin and zinc as sulfides. However, their disadvantage is due to the fact that the admissible pH-value is limited to values of above 7 as in the acid range the ineffective precipitation of free acid takes place.

However, the stability constants of many heavy metal complexes, particularly from the type of the often used polyamine carbonic acids, are especially dependent on pH-values to the extent that with higher pH-values a greater stability occurs than in the acidic range. The precipitation of complexed metals is then only possible with a complicated procedure by means of decomplexing with iron-III ions.

However, in the complete absence of complexing agents and with strict enforcement of the optimal operating conditions, it is possible to just remain below the new limit values of the 40th General Administrative Regulation on Minimum Requirements for Running Waste Water into Bodies of Water [receiving water] according to §7a of the Water Management Law (WHG=Wasserhaushaltsgesetz), using hydroxide precipitation if an additional filtration of the treated waste waters is also done. Such an operation is, however, very costly and provides no guarantee for a constant following of legal regulations as the security range between the attainable values and the limit values is too narrow with a factor of about 1.5 to 2. Even the smallest malfunctions lead in these cases to an exceeding of the admissible values.

In the precipitation of heavy and non-ferrous heavy metals with polysulfides, the toxic hydrogen sulfides are replaced by alkaline or alkaline earth polysulfides. However, the disadvantage of the polysulfide precipitation agents known to-date is that they have a poor solubility in water and thus require an increase in material with the according cost increase.

In addition, the customary precipitation means have the disadvantage that they are mainly confined to the acid pH-range. A precipitation of heavy metal ions from very acid media and from strongly alkali media with the same precipitation agent has so far not been successful.

SUMMARY OF THE INVENTION

It is thus the task of the current invention to indicate a compound for the treatment of with metal ions contaminated water which works with satisfactory results over the whole range from pH 0 to 14.

According to the invention, a compound for the treatment of water polluted by metal ions is obtained by the reaction of potassium or sodium hydroxide in aqueous solution with thiocarbamide and potassium or sodium hyposulfite. After a period of settling, a precipitate forms and is removed; the clear liquid above the precipitate is used for treating water polluted with metal ions. The precipitate is formed more efficiently if a flocculant accelerator is used such as a xanthate or sodium diethyl dithiocarbamate.

DESCRIPTION OF THE PREFERRED EMBODIMENTS

As indicated above, according to the invention, a compound for the treatment of water polluted by metal ions is obtained by the reaction of potassium or sodium hydroxide in aqueous solution with thiocarbamide and potassium or sodium hyposulfate. After a period of settling, a precipitate forms and is removed; the clear liquid above the precipitate is decanted and used for treating water polluted with metal ions.

The compound formed with the reaction of these substances, or the resulting mixture of sulfur compounds has not yet been analyzed as to its structure and chemical formula.

The compound is suitable for the precipitation of heavy metals from acid media (down to pH 0.5) through strong alkaline media (pH 14.0, 10-mole soda lye or caustic potash solution). The heavy metals are precipitated as metal sulfides. The compound according to the invention is particularly suitable for precipitation in the neutral to strongly alkali pH-range of metals, which are otherwise preferably precipitated in the acid pH-range. Thus, mercury sulfide, cadmium sulfide, lead sulfide and nickel sulfides are precipitated still at pH 12 in quantitative amounts from aqueous solutions. Nickel and cadmium ions can also be precipitated from concentrated soda lye and caustic potash solution (10 mole) in the form of their sulfides. The precipitation of copper ions is well possible up to a pH-value of 10.0. In addition, zinc can easily be precipitated. The compound according to the invention is also suitable for a stabilization of the chromium III hydroxide precipitation up to clearly below the limit value of 0.5 mg/l. Based on its precipitation properties, the compound is thus very good for the simultaneous sulfide second precipitation in the neutral and weakly alkali range after a previous hydroxide main precipitation.

With the compound according to the invention it is easily possible to attain values up to 1/10 of the new limit values, which means a safety factor of 10. Even small malfunctions in the treatment installation will thus not lead to exceeding the limit values.

Potassium hydroxide and sodium hydroxide are easily and cheaply available, so that the price of the compound can be kept low.

Potassium hyposulfite and sodium hyposulfite are also easily and at affordable prices available through commercial sources.

In another preferred model, sodium hydroxide, thiocarbamide and sodium hyposulfite are brought to a weight ratio of 1:2:1 for reaction. With this ratio a compound is made which is particularly suitable for the precipitation of mercury and lead in the neutral pH-range (pH 6 to 9.5), but also suitable for the precipitation of cadmium, nickel and zinc in the neutral to strongly alkali range. Mercury ions play a special role in the waste water from power plants and incinerators, where they get into the water during the desulfurization of flue gases. With the compound according to the invention they can still be precipitated in the alkali range without reacidification. For the desulfurization of flue gases the addition of the compound before the spray drying phase is preferred.

In another preferred model of the invention, the compound contains an alkalisulfite and/or hydrogen sulfite and/or disulfite. The sulfites, particularly the disulfite, are used for the production of a reducing climate in the solution for long-term stabilization of the thiosulfuric components. In a technical application, a disulfite can be handled more easily and safely than a sulfite, e.g., sodium sulfite, as it does not produce any free sulfur dioxide in the dry state. In application, the sulfite component produces an immediate binding of the remaining oxide in the treatment medium, which prevents a reduction of the precipitation effect of thiocompounds in heavy metal precipitation.

It is also preferred that the compound contains sodium diethyl dithiocarbamate ($C_5H_{10}NNaS_2.3H_2O$). This substance serves as flocculation accelerator, thus has the task of effecting a more rapid clustering of finely dispersing precipitates during precipitation, particularly in the strongly alkali range.

It is also preferred that a xanthate is used during the reaction. The xanthate has similar effects as the sodium diethyl dithiocarbamate as flocculation accelerator and effects a better clustering of the precipitated metal sulfide as well as a stabilization of the precipitation effect.

A reaction of sodium hydroxide, thiocarbamide, sodium hyposulfite, sodium disulfite and sodium diethyl dithiocarbamate or xanthate at a weight ratio of 50:100:50:20:2 is preferred. With such a mixture, the precipitation of mercury and lead in the neutral pH-range (pH 6 to 9.5), but also the precipitation of cadmium, nickel and zinc in the neutral to strongly alkali range is strengthened.

The mixture according to the invention reacts, while separating ammonium, into a slightly yellow opaque solution, whereby, during the course of 48 hours after mixing, a greenish-black precipitate of a small quantity and finely grained consistency precipitates. The clear solution above is separated [decanted] from the precipitate and represents the finished compound. The procedure has the advantage that, contrary to polysulfide-polysulfane precipitation agents, it does not set free any toxic hydrosulfides.

It is preferred that the sodium disulfite is added before the addition of the sodium hyposulfite in order to stabilize the thiocarbamide before its reaction with the hyposulfite. The sodium diethyl dithiocarbamate can be added last, as it is only supposed to have the effect of enhancing flocculation. Similarly to the sodium diethyl dithiocarbamate, the xanthate can be added towards the end of the reaction in order to attain an acceleration of the flocculation. Both substances, i.e., the sodium diethyl dithiocarbamate as well as the xanthate, can, however, be added already at the start, i.e., about 1 hour after mixing. It has not yet been determined conclusively, if they play also a role in the compound according to the invention. The xanthate may possibly have a catalytic effect.

The so far known effects are mainly related to the metals mercury, cadmium, lead, nickel and zinc. These are in practice the most frequently occurring heavy metal pollutants. However, the compound according to the invention is not limited as precipitation agent for these metals.

In the application of the compound according to the invention, clearly defined amounts per waste water volume cannot be determined as the matrix effect of the waste water fluctuate generally to such an extent that an optimum application has to be determined empirically. Included in these matrix effects are neutral salts contents, surfactant additives, sizing agents and, for example, also mineral oil contents.

However, it has been determined that for heavy metal contents between 5 and 50 mg/l by application of the purely sulfidic precipitation a ratio for compound/waste water of 1/5000 (0.2 kg/$m^3$ leads to complete precipitation.

For the above mentioned hydroxide, sulfide secondary precipitation a compound/waste water ratio of 1/10000 and 1/50000 is sufficient. However, here too, the volume to be used for an optimal precipitation effect has to be determined empirically, depending on the waste water to be treated.

Below, the production of 1 $m^3$ of the compound according to the invention is explained, using an example.

Production example:

For the mass production of the compound according to the invention kettles of stainless steel, primarily of V-4A, with stirring device (100 $min^{-1}$) are needed. The water to be used in the mixture has to be fully deionized, e.g., produced through mixed anion and cation resin exchanger.

For the production of 1 $m^3$ of the compound according to the invention, 400 liters of deionized water is put into a 1.5 $m^3$ container fitted with a stirring device, and then 50 kg of chemically pure sodium hydroxide, in the form of flakes or pearls, are added while stirring.

After complete dissolution thereof, 100 kg thiocarbamide, chemically pure, approx. 99% and another 300 l desalted water are added.

After dissolution of most of the thiocarbamide (solution becomes cloudy) 20 kg sodium disulfite, chemically pure, are added.

After stirring for about 10 minutes, another 197 l water are added and then 50 kg sodium hyposulfite. After further stirring of 30 minutes, 2 kg sodium diethyl dithiocarbamate in the form of a liquid 25% technical product (Percazit SDEC), i.e., 8 kg of the industrial liquid product, are added. Finally, after another short time of stirring, 2 kg of a xanthate are added.

The finished mixture is stirred for about 4 hours. The solution then remains without stirring for another 44 hours for reaction. Thus, the compound according to the invention, will be ready for use 48 hours after mixing. The precipitated precipitate is then separated from the clear liquid above it, which represents the precipitation agent.

The physical and physical/chemical characteristics of the product are as follows:

Form: liquid; color: clear, slightly yellow; smell: slight ammonia, putrid;

Density at 20° C.: 1.125 g/$cm^3$; steam pressure at 20° C.: 20.8 mbar;

Viscosity at 20° C., according to DIN 51562: 1.50 $mm^2$/s = 1.69 mP

Boiling point at 1013 mbar: 103.1° C.; crystallization point: 5.5° C.; pH value: 13.25.

I claim:

1. A compound for the treatment of water polluted by metal ions, obtained by performance of the following steps:

reacting potassium or sodium hydroxide in an aqueous solution with thiocarbamide and potassium or sodium hyposulfite, such that a precipitate is formed in a liquid in a vessel containing the reactants;

permitting the precipitate to settle in the vessel; and separating the liquid from the precipitate thus formed;

wherein the separated liquid is the compound for treatment of water.

2. The compound according to claim 1, wherein sodium hydroxide, thiocarbamide and sodium hyposulfite for the reaction are provided at an approximate ratio by weight of 1:2:1, respectively.

3. The compound according to claim 1, further comprising an alkali sulfite and/or hydrogen sulfite and/or disulfite.

4. The compound according to claim 1, further comprising sodium disulfite.

5. The compound according to claim 1, wherein sodium diethyl dithiocarbamate is added as a flocculation accelerator.

6. The compound according to claim 1, further comprising a flocculation accelerator added to the reactants.

7. The compound according to claim 6, wherein a xanthate is provided as said flocculation accelerator.

8. The compound according to claim 6, wherein the reactants comprise sodium hydroxide, thiocarbamide, sodium hyposulfite, and sodium disulfite, and sodium diethyl dithiocarbamate or xanthate is added as a flocculation accelerator, said reactants and said flocculation accelerator being provided at an approximate ratio by weight of 50:100:50:20:2.

9. The compound according to claim 1, wherein said aqueous solution is prepared employing deionized water.

10. A method for the production of a compound for the treatment of water polluted with metal ions, comprising the steps of adding thiocarbamide and potassium or sodium hyposulfite to potassium or sodium hydroxide in aqueous solution, stirring the resulting solution, allowing the solution to stand such that a precipitate forms in a clear liquid, and separating the clear liquid from the precipitate, such that the clear liquid can be employed for treatment of polluted water.

11. The method according to claim 10, wherein thiocarbamide, sodium disulfite, and sodium hyposulfite are added to sodium hydroxide in aqueous solution in sequence while stirring the solution, and followed by addition of a flocculant selected from the group consisting of sodium diethyl dithiocarbamate and xanthate followed by said steps of allowing the solution to stand in a vessel and separating the clear liquid from the precipitate.

12. Method for removing metal ions from a water stream polluted thereby, comprising the steps of adding thiocarbamide and potassium or sodium hyposulfite to potassium or sodium hydroxide in aqueous solution, stirring the resulting solution, allowing the solution to stand such that a precipitate forms in a clear liquid, separating the clear liquid from the precipitate, and treating said polluted water stream with said clear liquid.

* * * * *